United States Patent
Esly et al.

(10) Patent No.: US 6,834,562 B2
(45) Date of Patent: Dec. 28, 2004

(54) MOTOR VEHICLE WITH GEARBOX

(75) Inventors: Norbert Esly, Bühl (DE); Jens Benndorf, Bühl (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 140 days.

(21) Appl. No.: 10/256,272

(22) Filed: Sep. 26, 2002

(65) Prior Publication Data

US 2003/0074998 A1 Apr. 24, 2003

Related U.S. Application Data

(63) Continuation of application No. PCT/DE01/01129, filed on Mar. 22, 2001.

(30) Foreign Application Priority Data

| Mar. 28, 2000 | (DE) | 100 15 374 |
| Mar. 29, 2000 | (DE) | 100 15 720 |
| May 17, 2000 | (DE) | 100 24 187 |

(51) Int. Cl.$^7$ .................... B60K 17/06; B60K 20/00
(52) U.S. Cl. .................. 74/335; 74/473.12; 74/473.25
(58) Field of Search ................. 74/335, 473.12, 74/473.21, 473.24, 473.25, 498, 500

(56) References Cited

U.S. PATENT DOCUMENTS

| 6,321,612 B1 | * 11/2001 | Leimbach et al. ........... 74/335 |
| 6,327,927 B1 | * 12/2001 | Rogg et al. .................. 74/335 |
| 6,588,294 B1 | * 7/2003 | Rogg ...................... 74/473.21 |

FOREIGN PATENT DOCUMENTS

| DE | 198 22 666 A1 | 12/1998 |
| DE | 198 32 015 A 1 | 2/1999 |
| DE | 199 04 021 A 1 | 8/1999 |
| DE | 199 04 022 A 1 | 8/1999 |
| DE | 199 13 492 A 1 | 10/1999 |
| DE | 100 29 620 A 1 | 12/2000 |
| DE | 100 31 754 A 1 | 1/2001 |
| GB | 1 399 370 | 7/1975 |
| GB | 2 338 272 | * 12/1999 |

OTHER PUBLICATIONS

1. Corresponds to 197 34 050 referred to on p. 25 of the instant Specification; 2., 3.,4., 5., and 6. correspond respectively to 198 04 214, 198 04 217, 198 14 126, 199 28 263, 199 30 869 and 199 37 544, referred to on p. 25 of the instant Specification.

* cited by examiner

Primary Examiner—Ha Ho
(74) Attorney, Agent, or Firm—Darby & Darby

(57) ABSTRACT

A motor vehicle includes a drive motor, a torque transfer device with an actuating device, a gearbox with at least one shift shaft, an actuating device, and a control device. The actuation of the torque transfer device and the gearbox is automatically controlled through the control device or an input thereto. The gearbox actuation includes a first and second movement component, e.g., a rotational and translation movement. The gearbox actuating device has a first and second drive dedicated to the first and second movement components. A multi part element transfers movement to the shift shaft and includes at least one axial groove for the axial guidance and rotational movement transfer, and at least one ring groove or ring groove segment for the rotational guidance and axial movement transfer. The multi part element includes at least one sleeve like element having a toothed spline, a follower, and a toothed rod.

33 Claims, 10 Drawing Sheets

MOTOR VEHICLE WITH GEARBOX

CROSS-REFERENCE TO RELATED APPLICATION

This application is a continuation of International Patent Application Serial No. PCT/DE01/01129, filed Mar. 22, 2001, which is hereby incorporated by reference in its entirety.

TECHNICAL FIELD

The present invention relates to a motor vehicle with a drive motor, a torque transfer device, such as clutch, with an actuating device, a gearbox with a shift shaft, an actuating device and a control device, in which the actuation of the torque transfer device and/or the gearbox can be carried out automatically through the control device or through an input to the control device, wherein the actuation of the gearbox comprises substantially a first movement component such as selection component, and a second movement component such as shift component, the gearbox actuating device has a first and second drive dedicated to this first and second movement, and at the gearbox the one movement is a translation movement and the other movement is a rotational movement. The movement for actuating the gearbox can be divided into two movement components, such as selection component and shift component.

BACKGROUND

It is known to allot each of these movement components its own drive. The movements of these two drives are converted into a rotational and a translation movement at the shift shaft of the gearbox through conversion of the path and force conditions.

The problem here is the connection between the drives and the shift shaft. The demands on the transfer path regarding the path and force conditions, shift speed, shift time and shift comfort lead to expensive designs which are complicated and cost-intensive and difficult to assemble.

SUMMARY

The object of the invention is therefore to provide a motor vehicle with an automated shift gear which has a reduced number of parts, is more cost-effective and which with simple means meets the demands for the desired path and force conditions, the shift speed, shift time and shift comfort. The system is to have a simple compact structural shape adapted to the structural space and easy to assemble.

This is achieved according to the invention in that a multi-part element is provided for transferring movement to the shift shaft which (element) has for connecting the individual parts at least one axial groove for axial guidance and rotational movement transfer as well as at least one ring groove or a ring groove segment for the rotational guidance and axial movement transfer.

Furthermore this is achieved in that the kinematic transfer path for converting the movement of one drive into a selection movement comprises a first gearbox stage, such as a worm with worm wheel, driven by the drive, and preferably integrated in the drive, as well as a second gearbox stage on the output side of same and formed for example by a spur wheel and toothed rod.

Furthermore this is achieved in that the kinematic transfer path for converting the movement of the other drive into a shift movement comprises a first gearbox stage, such as worm with worm wheel, driven by the drive and preferably integrated in the drive, a shift elasticity preferably integrated in the drive, as well as a second gearbox stage on the output side, formed for example by a spur wheel and toothed rod.

The subject of the sub-claims form further preferred developments of the invention.

In a preferred embodiment of the invention the multi-part element for transferring movement to the shift shaft comprises at least one sleeve-like element provided with teeth, a follower as well as a toothed rod.

Advantageously an axial relative movement is possible between the parts of the multi-part element for transferring movement to the shift shaft, and/or a rotational relative movement is possible between the other parts of the element.

Advantageously the multi-part element for transferring movement to the shift shaft enables an uncoupled movement transfer of the selection and shift movement to the shift shaft.

In a preferred embodiment the follower and the sleeve-like element are in active connection by means of at least one axial groove, preferably by means of three grooves and/or the follower and the toothed rod are in active connection by means of a ring groove segment whose centre point lies at least close to the axis of the sleeve-like element.

According to a further advantageous embodiment of the invention the introduction of a rotational movement is possible through the sleeve like element through a certain region independently of the relative position of the sleeve like element and follower relative to each other and/or the introduction of an axial movement is possible through the toothed rod through a certain region independently of the relative position of the toothed rod and follower relative to each other.

The certain region in which the introduction of a rotational movement is independent of the relative position of the sleeve like element and follower relative to each other corresponds preferably at least approximately to the region in which the shift shaft is axially movable and the certain region in which the introduction of an axial movement is independent of the relative position of the toothed rod and follower relative to each other is at least approximately the region in which the shift shaft is rotationally movable.

Thus it is possible in particular to execute shift movements in each selection position.

Advantageously the follower of the multi-part element for transferring movement to the shift shaft is connected rotationally secured and axially secured to the shift shaft.

In a preferred embodiment the transfer of the selection movement is through the toothed rod and the follower. The transfer of the shift movement is through the sleeve-like element and the follower.

Advantageously the follower has springs corresponding with the grooves located in the sleeve-like element.

In an advantageous embodiment of the invention the configuration and number of the grooves or groove flanks and correspondingly the springs or spring flanks are suitable to centre the follower when rotationally loaded in the sleeve-like element.

According to a preferred embodiment the sleeve has a longitudinally extending opening.

According to a further advantageous embodiment of the invention the opening of the sleeve does not extend over the entire length. The length of the opening corresponds at least approximately to the movement of the shift shaft in the selection direction.

Advantageously it can be advisable if the sleeve opening is produced through a wider development of one of the grooves wherein the groove is formed wider radially outwards and the groove flanks are formed wider accordingly.

In a preferred embodiment of the invention the opening, like the other grooves which are not formed wider radially outwards, provides a guiding function for the follower during axial relative movement between the follower and sleeve like element.

A connection can advantageously be produced through the opening in the sleeve like element between the follower and the toothed rod.

In a further advantageous development of the invention a spring of the follower is designed so that it extends to the outside through the opening of the sleeve-like element.

Furthermore it can be advantageous if the end region of the spring of the follower extending through the opening of the sleeve closes in a circular sector shape with the centre point to the shift shaft axis.

Preferably one development of the invention is where the end region of the spring of the follower extending through the opening of the sleeve itself forms a spring which sits in a corresponding groove in the toothed rod rotationally movable and able to transfer axial movement.

An embodiment of the invention is particularly preferred where the side edges of the grooves are formed so that during force transfer the resulting force on the sleeve has a radial component which causes strain in the closing direction of the opening.

Advantageously the side edges of the grooves have the shape of an inverted involute.

According to a particularly preferred embodiment of the invention the toothed rod is formed in the transfer path of the shift movement as a double toothed rod and has two sets of teeth independently of each other.

Particularly advantageously the angle of the two toothed planes relative to each other and the axial spacing between the teeth enable the drive for the shift shaft to be arranged adapted to the existing structural space.

In the present embodiment the toothed planes advantageously stand at roughly right angles to each other.

BRIEF DESCRIPTION OF THE DRAWING FIGURES

The invention will now be explained with reference to the embodiments illustrated in the drawings in which.

DETAILED DESCRIPTION OF PREFERRED EMBODIMENTS

Figure 1:
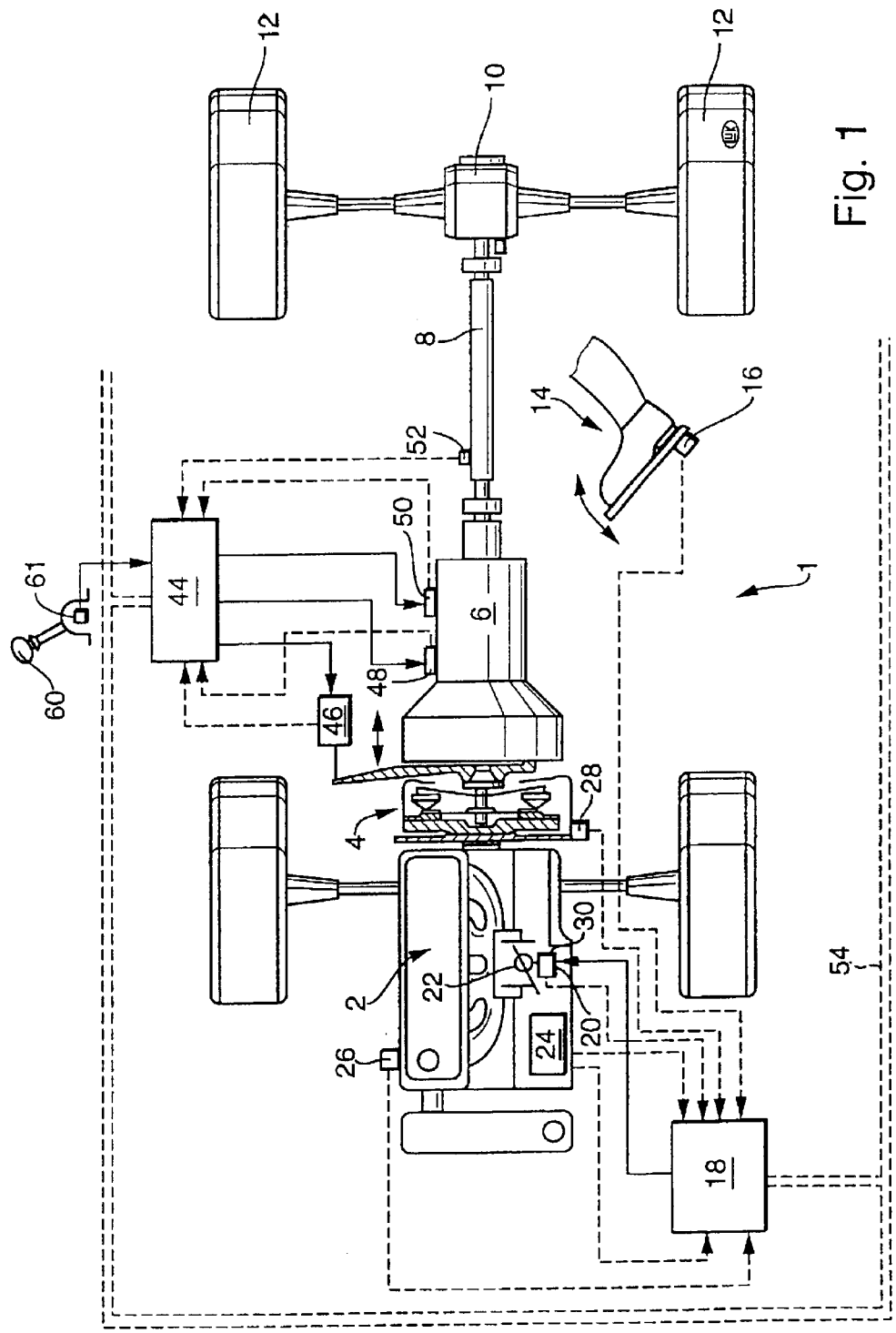
FIG. 1 shows a plan view of a vehicle with drive train, gearbox actuating device and control device.

FIG. 1 shows diagrammatically a motor vehicle 1 with a drive train which contains a drive motor 2, formed as an internal combustion engine, a clutch 4 and a gearbox 6. The wheels 12 of the vehicle 1 are driven through a cardan shaft 8 and a differential 10. Obviously it can also be a vehicle with one or more differently driven axles.

There is a transmission selection device 60 such as selection lever with sensor 61 and a control device 18, 44 as block circuit diagram. The control device 18, 44 can be formed as one unit or can be formed in structurally and/or functionally separated partial regions. If the control device 18, 44 is formed in structurally and/or functionally separated partial regions, these can be connected together for data exchange for example through a CAN bus 54 or another electrical connection. The control device 18, 44 controls by way of example the automated actuation of the gearbox 6 and/or the clutch 4 or motor 2, such as the engine torque, the selection of the gear transmission ratio, a parking position or neutral position of the gearbox or the torque transferable by the clutch.

The device for changing the transmission ratio of the gearbox comprises at least one actuator 48, 50 and a control device 44 wherein the transmission ratio can be changed by controlling the actuator 48, 50. The clutch 4 can also be actuated automatically by means of the actuator 46.

The region 44 of the control device receives signals which represent at least the transmission state of the clutch 2 and the transmission ratio set in the gearbox 6, as well as signals from a sensor 52 for the output speed and a sensor 61 on the transmission selection device 60. These signals are determined by sensors, such as a gear detection sensor or by a clutch path sensor.

Region 18 of the control device controls the internal combustion engine 2 through a displacement of the throttle valve 30 and/or the injection. Signals are received from sensors 26 for the suction intake pressure, 24 for the coolant temperature, 28 for the engine speed, 20 for the position of the throttle valve 22 and 16 for an accelerator pedal actuation 14.

The device for changing the transmission ratio of the gearbox comprises at least one actuator 48, 50 which comprises for example two electric motors wherein one electric motor is controlled for actuating the selection process and a second electric motor is controlled for actuating the shift process. For this purpose a displacement of at least a shift element on the gearbox side is actuated by means of the electric motors along the selection stretch or shift stretch.

Figure 2:
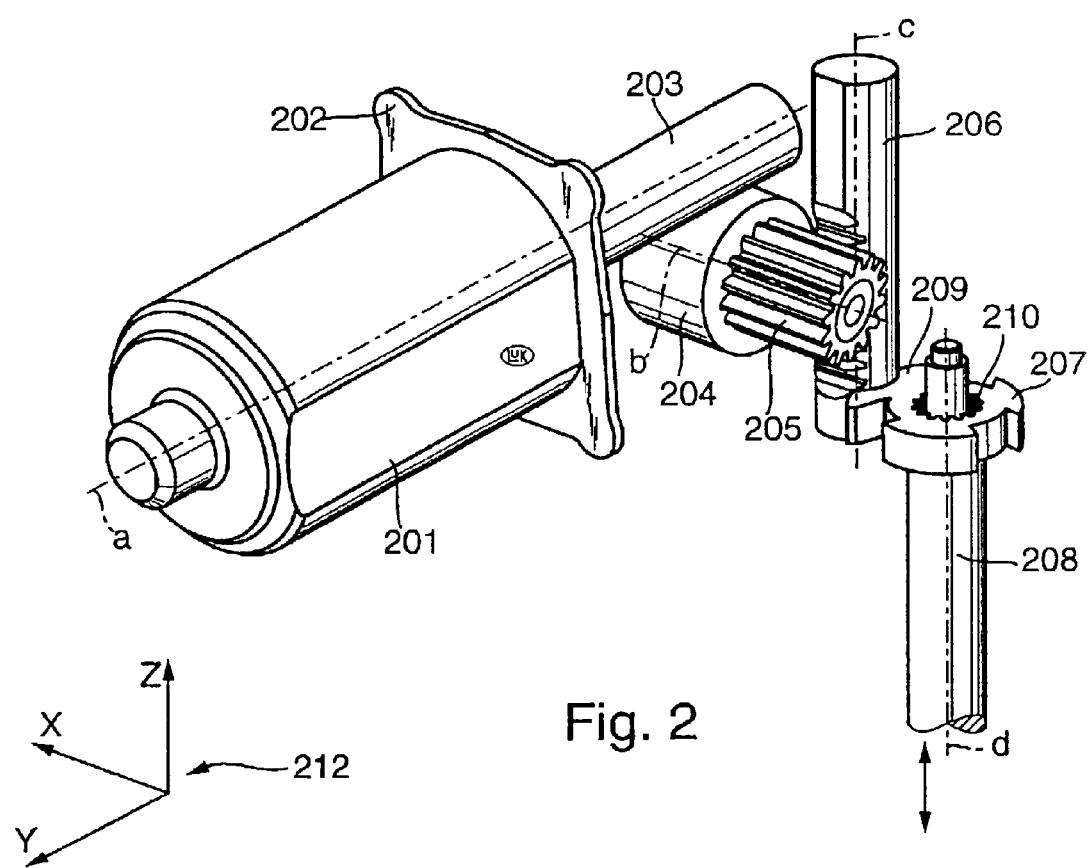
FIG. 2 shows the kinematics of the selection stretch.

FIG. 2 shows the kinematics of the selection stretch from the drive 201 to the shift shaft 208. The kinematic chain between the drive 201 and shift shaft 208, has a number of transmission stages so that a path and force conversion takes place corresponding to the selection forces and the path of the shift shaft 208 in the selection direction as well as the power of the drive 201. The arrangement of the kinematic chain furthermore enables all the elements belonging to the gearbox actuating device to be arranged relative to the shift shaft 208 according to the structural space available.

More particularly the gearbox actuating device for actuating the shift shaft 208 in the selection direction is suitable for converting the drive 201 into an axial selection movement of the shift shaft 208 and for this purpose there are here two gearbox stages.

The drive 201 can be formed for example as an electric motor and has in the illustrated drawing a fixing flange 202. A worm 203 which is part of a first gearbox stage is connected to the armature shaft of the drive motor 201. The drive 201 drives a spur wheel 205 through this first gearbox stage which is formed from the worm 203 and worm wheel 204. The spur wheel 205 and the worm wheel 204 have a common axis b which is perpendicular to the axis a of the drive. The spur wheel 205 forms with the toothed rod 206 a second gear box stage which is mounted on the output side of the first gearbox stage. The axes b of the spur wheel 205 and of the worm wheel 204 and c of the toothed rod 206 are perpendicular to each other.

In order to produce the gearbox stages it can also be expedient in another embodiment to use different elements and/or to use only one or more than two gearbox stages. Furthermore it can be expedient if the angle and/or the spacings of the axes a, b, c and/or d are enlarged or reduced. More particularly the toothed rod described and illustrated in detail in FIG. 8a and the further embodiment shown in FIG. 8b provide a suitable possibility here.

Figure 8A:
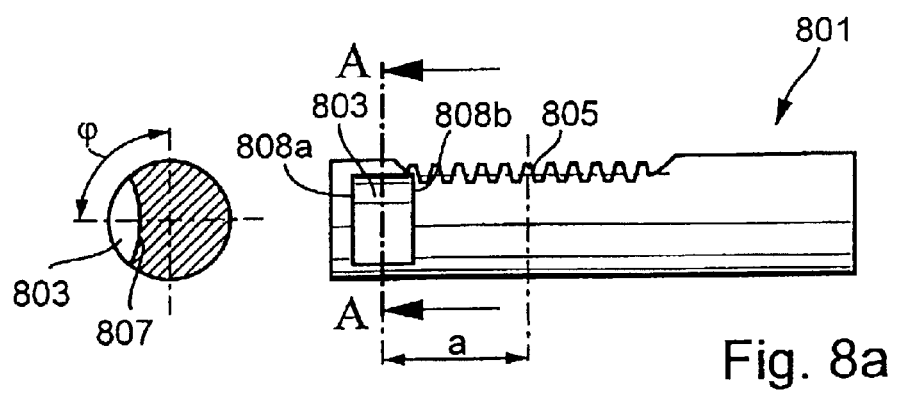
FIG. 8a shows a toothed rod in the transfer path of the selection movement.
Figure 8B:
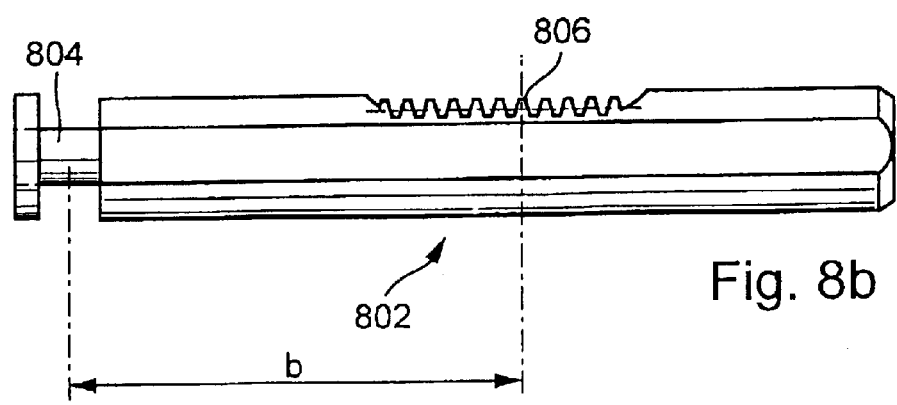
FIG. 8b shows a further embodiment of a toothed rod.

In order to transfer the selection movement to the shift shaft 208 with the axis d parallel to the axis c of the toothed rod 206, and in order to enable the shift movement to be independent, the toothed rod 206, as shown in detail in FIG. 8a, has a groove 803 at its end to provide the connection with the follower 207. For this purpose the follower 207 has a shoulder which projects into the groove 803. The groove and the follower are thereby formed so that they remain in engagement with each other even in the event of relative rotation. This is particularly advantageous since with a shift actuation of the gearbox the follower 207 as well as the shift shaft 208 are rotated about the axis d.

In the Cartesian co-ordinate system 212 the axis a is roughly parallel to the y-axis, the axis b is roughly parallel to the x-axis and the axes c and d are at least approximately parallel to the z-axis.

The described arrangement for a selection actuation is disposed in or on a support element which is described and illustrated in detail with reference to FIGS. 10a to 11b and which forms with partial regions also a housing or a housing-like structure which holds the elements, particularly those forming the gearbox stages.

Figure 3:
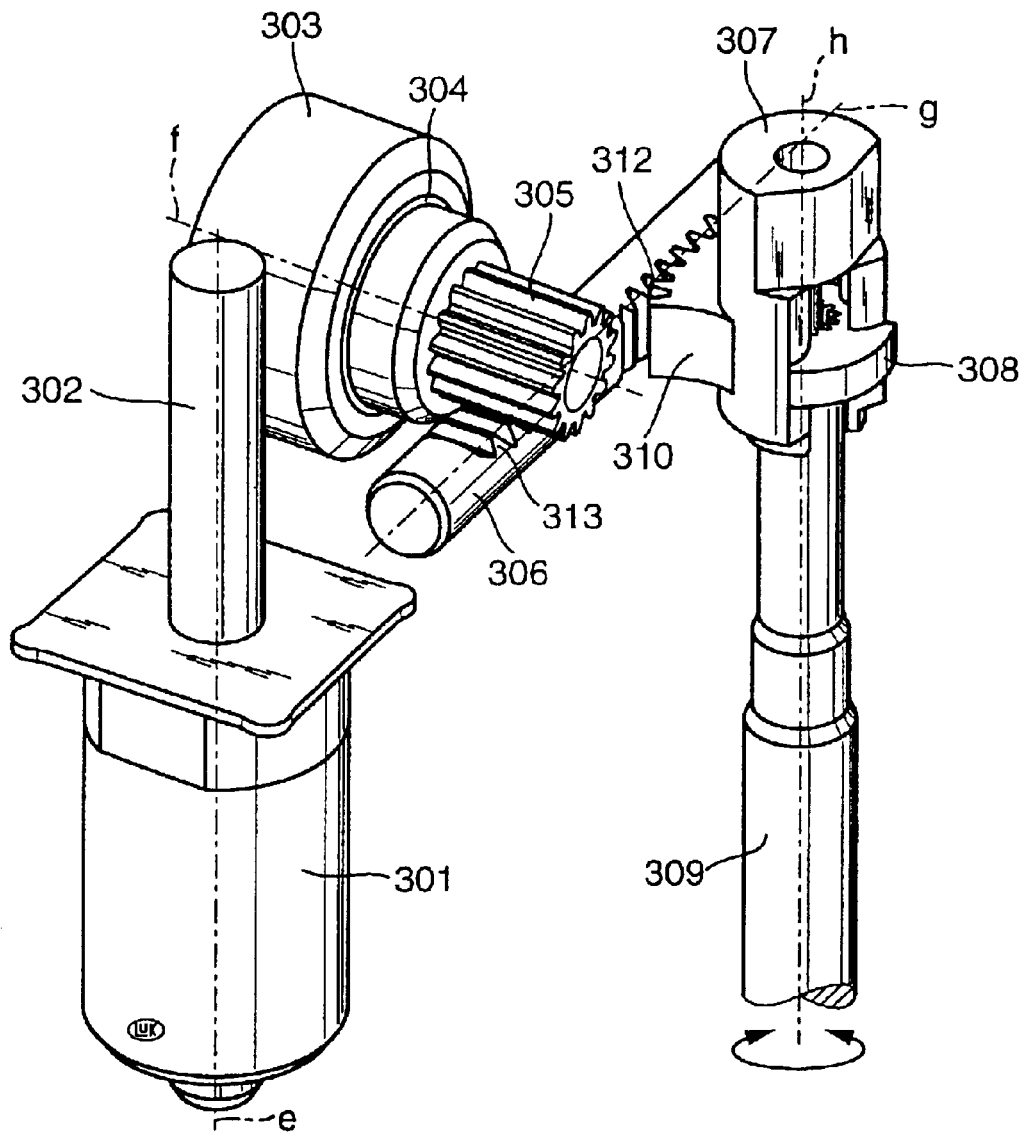
FIG. 3 shows the kinematics of the shift stretch.

The kinematics of the shift stretch from the drive 301 to the shift shaft 309 are shown in FIG. 3. The kinematic chain between the drive 301 and shift shaft 309 has a number of transmission stages so that a path and force conversion takes place corresponding to the shift forces and the path of the shift shaft 308 in the shift direction as well as the power of the drive 301. The arrangement of the kinematic chain furthermore enables all the elements belonging to the gearbox actuating device to be arranged relative to the shift shaft 309 in the structural space available.

More particularly the drive 301 which is preferably formed as an electric motor drives a worm 302 which is connected to a worm wheel 303. The worm 302 is preferably housed on the shaft of the electric motor and meshes with the worm toothed wheel 303 wherein the axis e of the drive 301 or worm 302 and the axis f of the worm wheel 303 are perpendicular to each other. A spur wheel 305 is driven through a shift elasticity 304; both elements are disposed axially identical with the worm wheel 303. The spur wheel 305 is connected to the teeth 313 of the toothed rod 306 whose axis g is disposed at least approximately normal to the axis f and forms a second gearbox stage mounted on the output side of the first gearbox stage which is formed from the worm 302 and worm wheel 303.

The axis g of the toothed rod 306 is roughly perpendicular to the axes f and e. The teeth 312 of the toothed rod 306 engage with the toothed segment 310 of the sleeve 307 of the multi-part element for motion transfer to the shift shaft 309, and thus forms a third gearbox stage. In a Cartesian co-ordinate system 311 the axes h of the shift shaft 309 and e of the drive 301 are at least approximately parallel to the z-axis, the axis f to the x-axis and the axis g to the y-axis.

Figure 7:
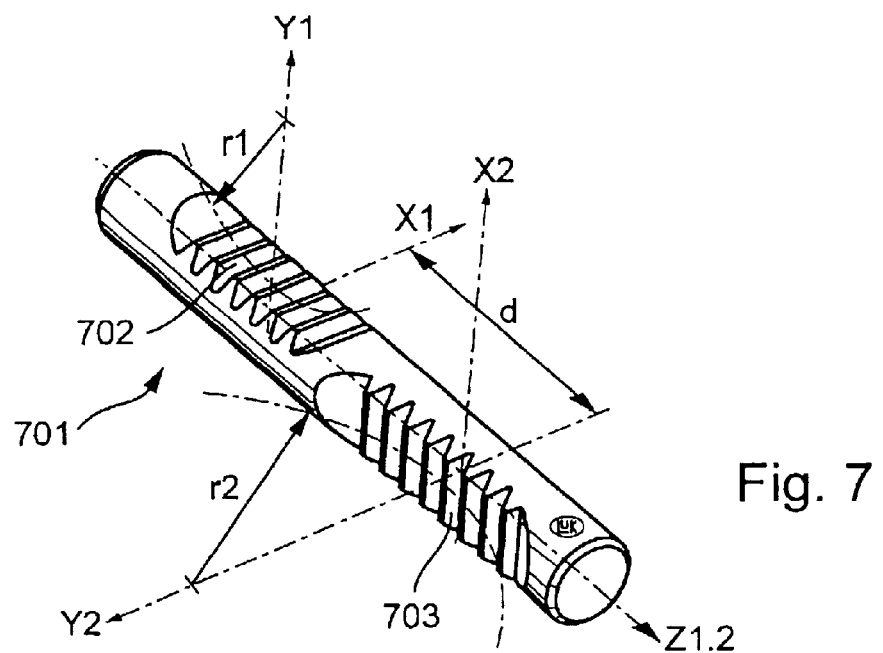
FIG. 7 shows a double toothed rod.

In order to produce the gearbox stages in another embodiment it can also be expedient to use different elements and/or to use only one, two or more than three gearbox stages. Furthermore it can be expedient if the angle and/or the spacings of the axes e, f, g and/or h are enlarged or reduced. More particularly the toothed rod 306, described and illustrated in detail in FIG. 7 provides a suitable possibility here.

The follower 308 is connected rotationally secured but axially movable with the sleeve 307. The follower 308 is connected axially and rotationally secured to the shift shaft 309.

The connection between the sleeve 307 and the follower 308 enables through a certain region of the axial positioning of the shift shaft 309 an independent rotational movement so that in each selection position the shift movement can be carried out uncoupled from same.

The arrangement described for a shift actuation is disposed in or on a support element which is described and illustrated in detail with reference to FIGS. 10a to 11b and which with partial areas also forms a housing or a housing-like structure which holds elements, more particularly those forming gearbox stages.

Figure 9:
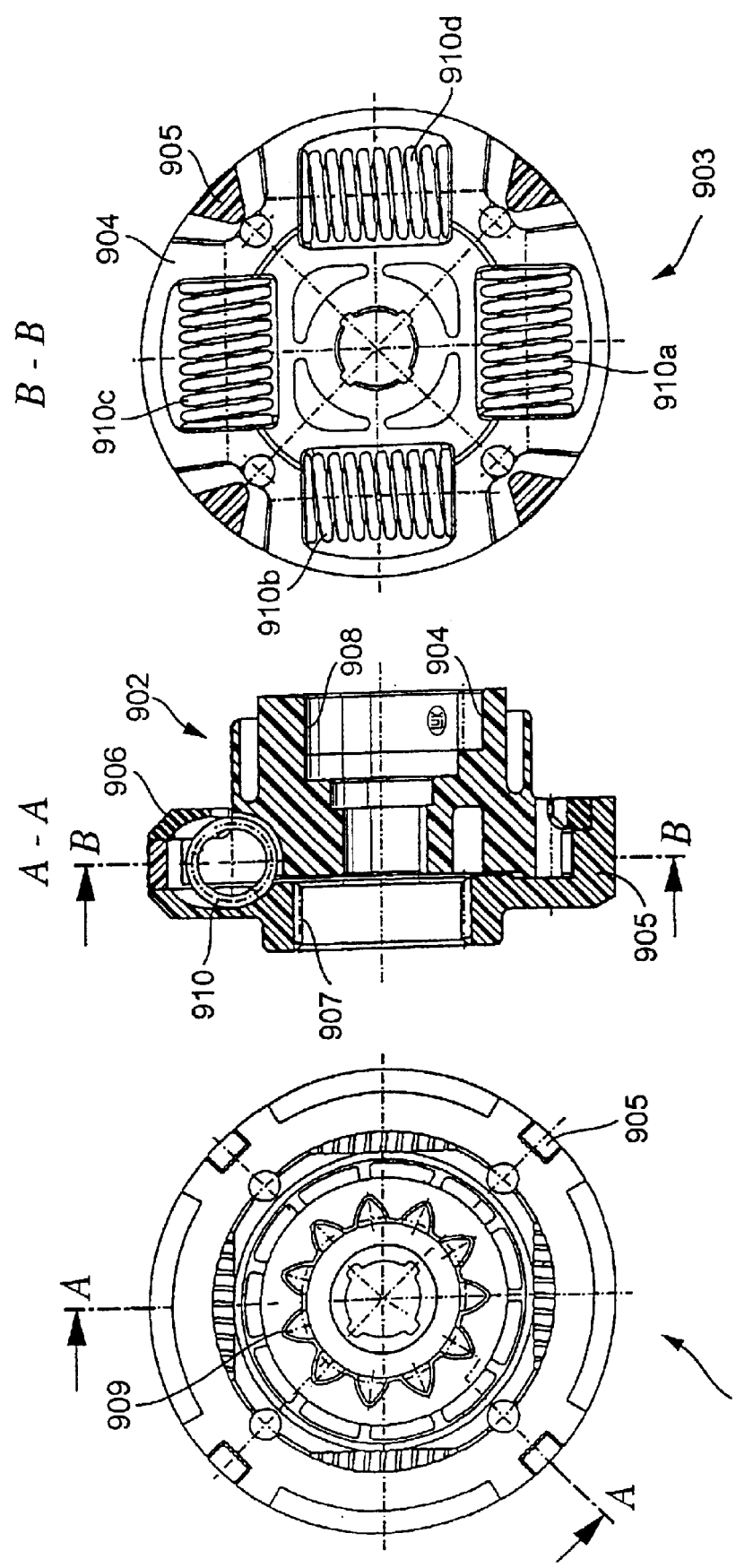
FIG. 9 shows a shift elasticity.

FIG. 9 shows the arrangement of the elements forming the shift elasticity. The shift elasticity is formed by two element parts 904 and 905 which are rotatable relative to each other in a certain angular region and which are connected together elastically and damped and of which one is connected with force locking and/or positive locking engagement to the worm wheel 303 and the other is connected with force and/or positive locking engagement to the spur wheel 305, for example by means of teeth 907 and 908. Springs and dampers of the shift elasticity advantageously have such characteristics that the drive is active corresponding to the kinematics and the processes on the shift clutch, by way of example is insulated from the force shocks caused by the shift processes. More particularly in the present example there are four springs 910a, 910b, 910c, and 910d which are connected in parallel and whose rigidities are added up. In order to reach the desired overall characteristic it can be advantageous if the springs have the same characteristics. In another embodiment it can however be advantageous to use springs having different characteristics. The use of springs with a linear characteristic is advantageous. If necessary however the use of progressive or degressive springs can also be advantageous. The damping is carried out linear in the present embodiment but in another embodiment it can also take place advantageously dependent on path and/or frequency.

901 shows a plan view of an embodiment, 902 and 903 show sections A—A and B—B. The force transfer on the drive side is through the teeth 907 to the element 905 on the drive side which is connected through springs 910 to the element 904 on the output side rotatable within a certain angular region. In the element 904 on the output side there is a toothed spline 908 in which a toothed wheel 909 can be fitted. The toothed wheel 909 can however also be fixedly connected to the element 904 or formed in one piece therewith. The ring-like element 906 is connected to the element 905 on the input side.

The toothed rod 801 illustrated in the embodiment in FIG. 8a has a toothed spline 805 and a groove 803. The groove 803 is here a segment of a ring groove whose centre point in the fitted state lies on the axis d illustrated in FIG. 2. It can however also be advantageous for other embodiments for example in order to adapt the entire arrangement of the gearbox actuation to the structural space available, to modify the toothed rod. More particularly it can be advantageous to enlarge or reduce the distance a between the groove 803 and the spline centre and/or the angle Φ between the groove 803 and spline 805 and/or to provide the groove with a different design.

A further embodiment is shown with the toothed rod 802 in FIG. 8b. The distance b between the groove 804 and the spline centre is greater than the distance a in FIG. 8a, the groove is formed as a ring groove with a centre relative to the toothed rod axis which particularly advantageously enables an engagement of the follower 207 independently of the radial angular position—marked in FIG. 8a by Φ—between the engagement point of the follower 207 and spline 806.

The follower 207 is connected axially and rotationally secured with the shift shaft 208. This connection is shown as a toothed shaft connection 210, but it can also be advantageous if the follower 207 and the shift shaft 208 are formed in one piece or the connection is produced in a different way.

By way of a spring and grooved connection 209 between the toothed rod 206 and the follower 207 it is possible to transfer movement axially in the direction of the shift shaft.

At the same time an independent rotational movement of the shift shaft 208 is possible where the follower 207 slides in the groove of the toothed rod.

Figure 6:
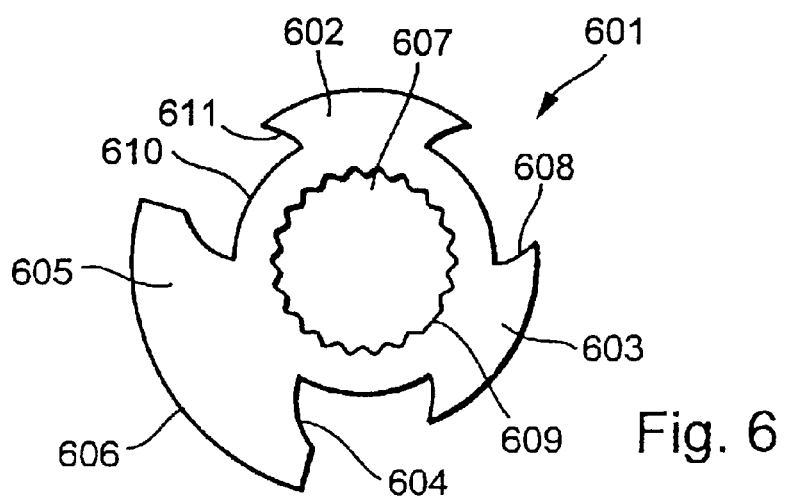
FIG. 6 shows a sectional view of the follower of the element for transferring movement to the shift shaft.

The wider spring 605 engages for this purpose in the groove 803 so that the radial outer region 606 of the spring 605 corresponds to the groove base 807 and the upper and lower sides of the spring 605 of the follower 601 shown in FIG. 6 are supported on the side regions 808a and 808b of the groove 803 for transferring movement and force.

Figure 4:
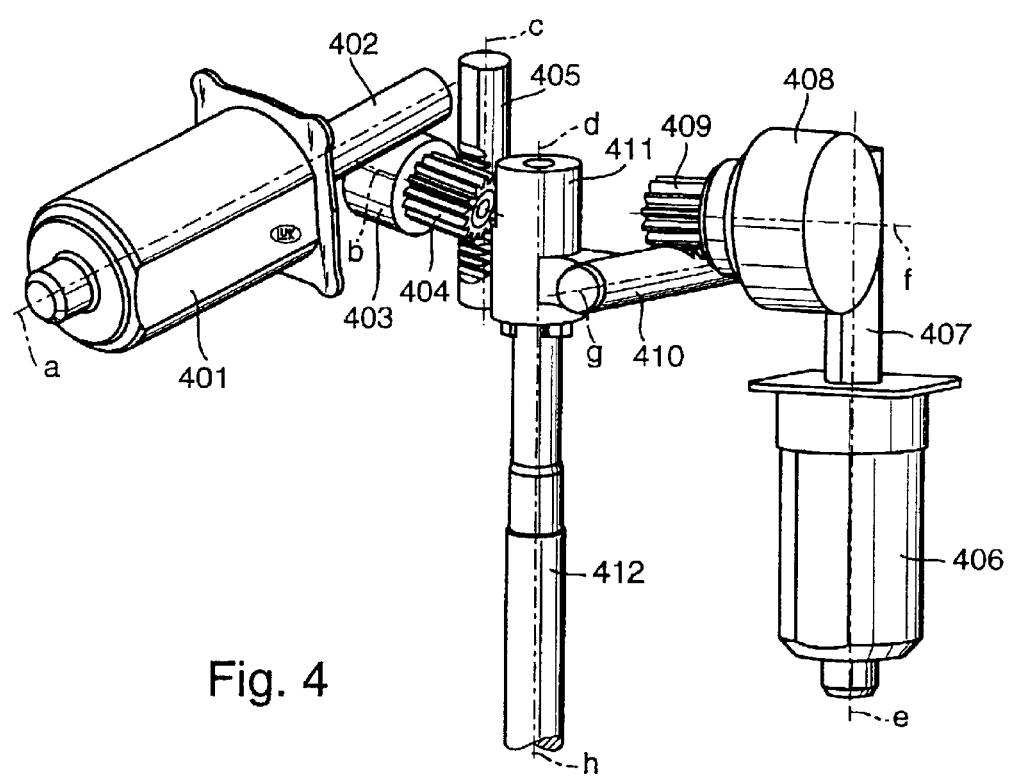
FIG. 4 shows the kinematics of the gearbox actuating device.

FIG. 4 shows the kinematics of the overall gearbox actuation, more particularly the spatial association between the selection and shift kinematics, as shown in FIGS. 2 and 3 from the drives 401 and 406 to the shift shaft 412.

Both the selection movement, generated by the drive 401, and the shift movement, generated by the drive 406, are transferred to the shift shaft through the follower (not visible in this view) and/or the sleeve 411.

The movement of the first drive 401 is converted into an axial movement, corresponding to a selection movement, through a worm 402, a worm wheel 403, a spur wheel 404, a toothed rod 405 and a follower (not visible here) connected to the shift shaft 412.

In order to convert the movement of the drive 406 into a rotational movement of the shift shaft 412, corresponding to a shift movement there is a worm 407, a worm wheel 408, a spur wheel 409, a toothed rod as well as an element, comprising a follower and sleeve 411, for transferring movement to the shift shaft.

The arrangement and designation of the axes used in FIG. 4 correspond to those used in FIGS. 2 and 3.

Figure 10A:
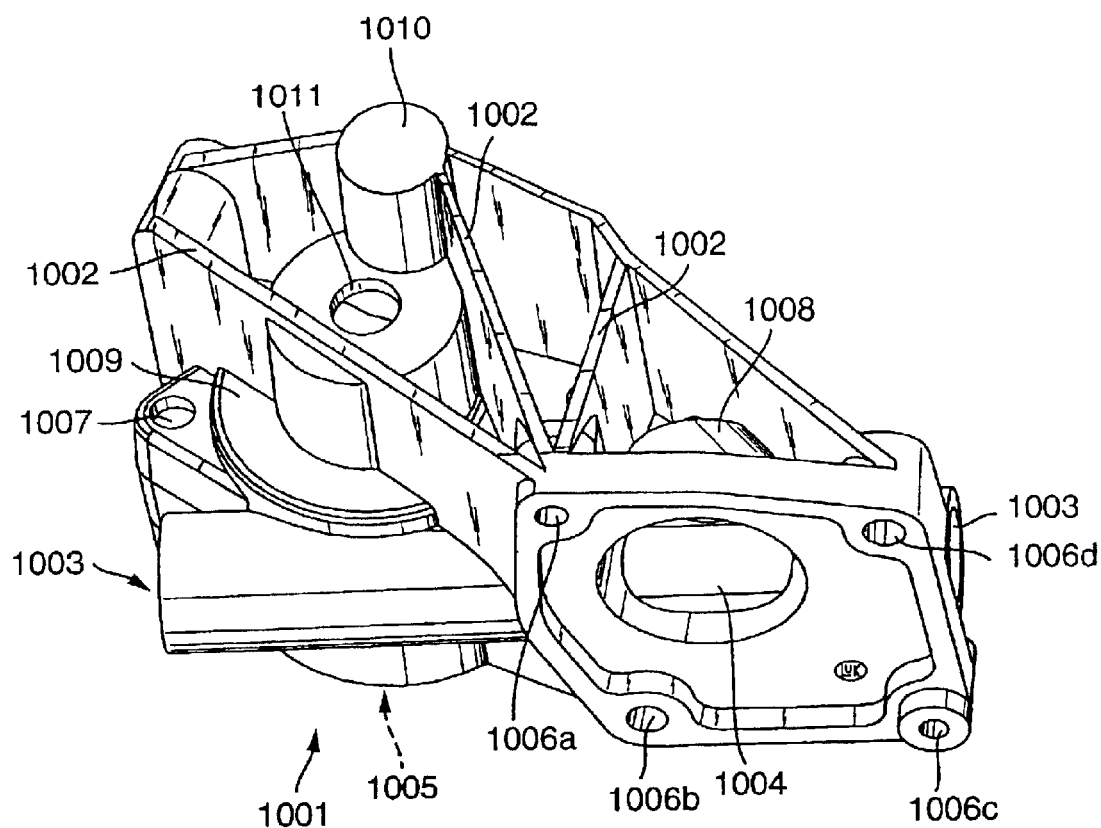
FIG. 10a shows a plan view of the upper part of a support element.

FIG. 10a shows an embodiment of the upper part 1001 of a support element in plan view. The upper part 1001 of the support element is formed for example by a number of ribs 1002 and is lightweight with good vibration behaviour; the support element is advantageously cast from aluminium.

The upper part 1001 of the support element forms in the present embodiment particularly advantageously for several gearbox stages a housing having dish-shaped areas 1008 and 1009; a toothed rod is housed and guided in the region 1010 for transferring the selection movement. The double toothed rod 701 already described in detail above as part of both gearbox stages is guided in the bore 1003. Access openings 1004 and 1005 (not visible in this view) to the teeth of the double toothed rod 701 are formed in the upper part 1001 of the support element. A toothed wheel 305 driven by one of the drives can enter into engagement with the double toothed rod 701 through the access opening 1004.

Bores 1006a, 1006b, 1006c and 806d are provided for screws for connecting the flange of one drive 301. The engagement through the access opening, 1005 is described and illustrated in the following figures.

The bore 1007, as well as a further bore (not visible here) serve to fix and position the lower part 1101 of the support element, as described and illustrated in FIGS. 9a and 9b, to the upper part 1001 or to the gearbox. The bore 1011 is provided for holding a bearing and at the same time enables pressure compensation during movement of the follower.

The axes of the dish-shaped regions 1008 and 1009 also lie roughly perpendicular to each other corresponding to the angle of the toothed planes of the double toothed rod 701 relative to each other. The axis of the bore 1010 for holding the toothed rod 206 for selection actuation lies parallel to the axis of the dish-shaped region 1009.

Figure 10B:
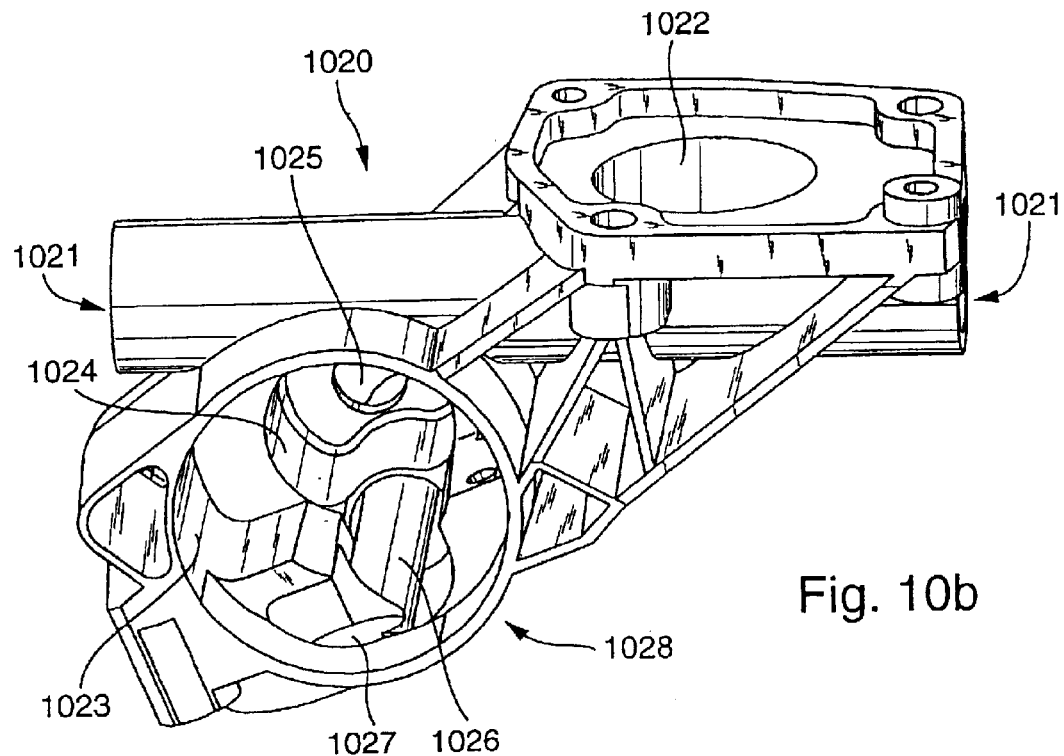
FIG. 10b shows a view from below of the upper part of a support element.

FIG. 10b shows the upper part 1020 of the support element from below. Next to the access opening 1022 to a spline of the toothed rod 701 guided in the bore 1021 can be seen in particular the access opening to the second spline of the double toothed rod 701. The overall dish-shaped design forms a housing 1028 for the sleeve 501 and the follower 601 of the element for transferring movement to the shift shaft. The sleeve 501 sits rotatable in the recess 1024 and thereby engages by its segment-shaped teeth 502 with the double toothed rod 701 whereby the opening 507 of the sleeve 501 and thus also the wider formed spring 605 of the follower 601 face the bore 1026 so that engagement is produced with the toothed rod 206 guided in the bore 1026 for transferring the selection movement.

A drive toothed wheel 404 projects through the opening 1027 into the region 1023 of the housing 1028 formed in the upper part 1020 of the support element in order to drive the toothed rod 206.

Figure 10C:
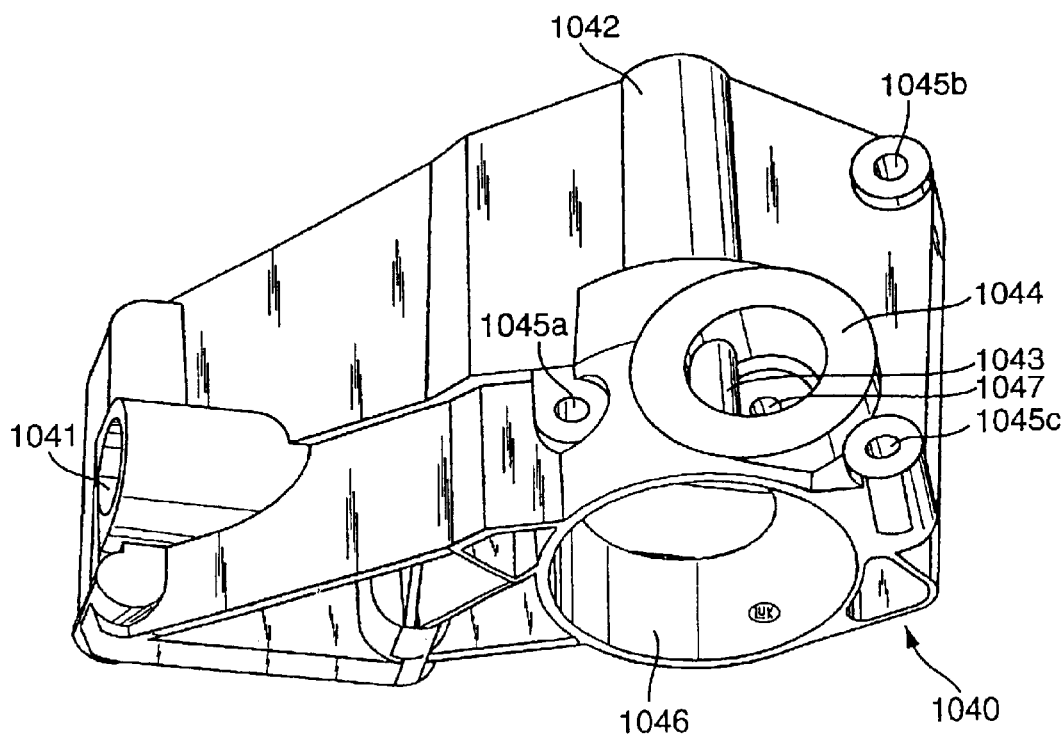
FIG. 10c shows a side view of the upper part of a support element.

A side view of the upper part 1040 of the support element is shown in FIG. 10c. This shows particularly clearly the region of the support element which forms the housing to hold the gearbox stages for the selection and shift movement transfer.

The double toothed rod 701 is guided in the bore 1041 and in a dish-shaped region 106 the shift movement is transferred from the double toothed rod 701 to the sleeve 501 of the element to transfer movement to the shift shaft. The toothed rod 206 for transferring the selection movement is guided in the region 1042 of the support element and the drive is through the opening 1043 through which the spline of the toothed rod 206 is accessible. The selection drive 401 is attached by means of screws fixed in the bores 1045a, 1045b and 1045c whereby it is seated tight on the flange 1044. The axis of the drive 401 is advantageously mounted in the bore 1047.

Figure 11A:
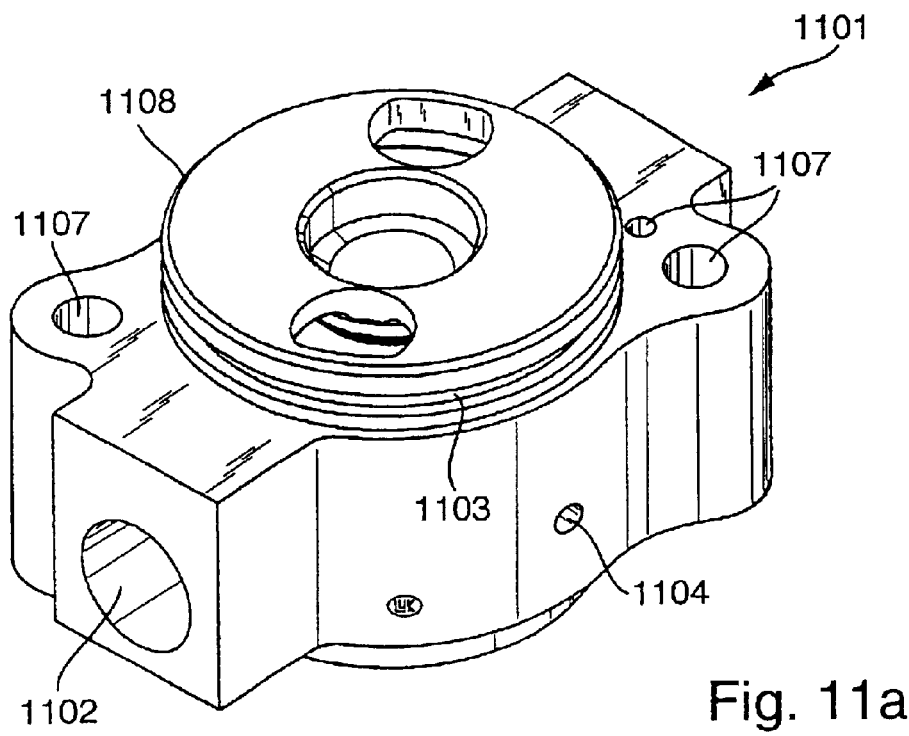
FIG. 11a shows a plan view of the lower part of a support element.
Figure 11B:
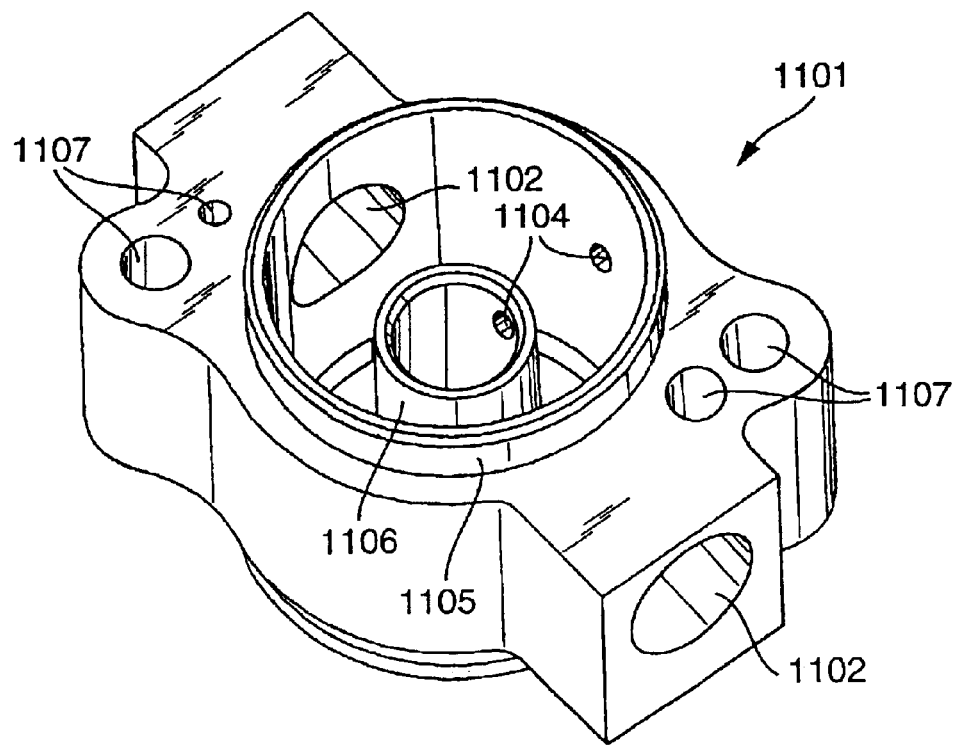
FIG. 11b shows a view from below of the lower part of a support element.

The fixing and precision positioning of the upper part 1001, 1021 and 1041 on the gearbox and relative to the shift shaft is undertaken by means of the lower part 1101 of the support element illustrated in FIGS. 11a and 11b. FIG. 11a shows a plan view of the lower part and FIG. 11b shows the lower part 1101 from below.

The lower part 1101 of the support element is seated with the collar 1108 in the region 1023 of the upper part 1001, 1021 and 1041, whereby an O-ring is provided in the groove 1103 to seal the connection points between the two parts. Bores 1107 are provided for fixing and positioning the parts relative to each other and on the gearbox.

The support element is connected accurately positioned through the collar 1105 to the gearbox whereby the shift shaft is guided in the dome 1106 and projects through this into the upper part 1001, 1021 and 1041 of the support element where the element engages for transferring the shift or selection movement.

Bores 1102 are provided at right angles to the axis of the shift shaft and hold a shift detent unit. A pin for guiding in a slide associated with the shift shaft is housed in the bore 1104.

Figure 5:
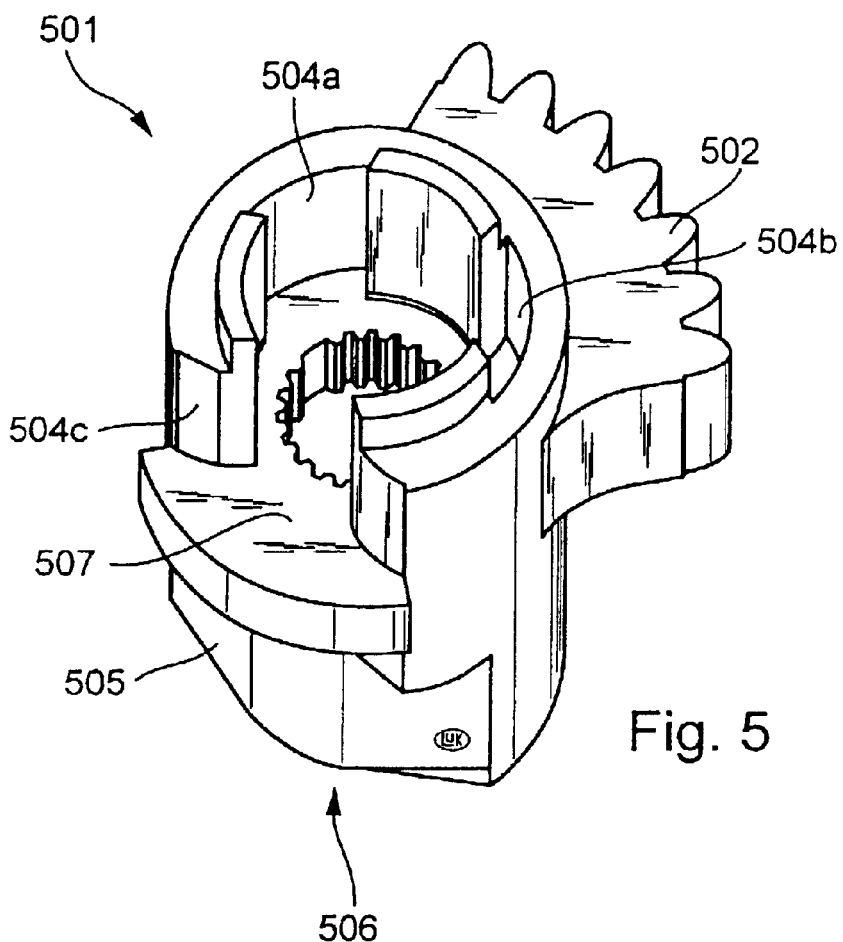
FIG. 5 shows a sleeve of the element for transferring movement to the shift shaft.

FIG. 5 shows the sleeve in a three-dimensional view and FIG. 6 shows the follower of the multi-part element for transferring movement to the shift shaft in plan view. This element which consists of the sleeve 501, the follower 601 and the toothed rod 801 enable an uncoupled transfer of the selection and shift movement to the shift shaft, whereby the selection movement corresponds to axial movement of the shift shaft and the shift movement corresponds to rotational movement of the shift shaft.

The transfer of the selection movement is solely through the follower 601 which can be fitted and axially secured for example with the recess 607 on the shift shaft, and has for rotationally secured connection a wedged profile 610. If a wedged profile is used then it is expedient for example to secure the relative position between the follower and the shift shaft through a widened recess 609 and a corresponding tooth on the shift shaft.

The transfer of the selection movement is through the toothed rod in the transfer path of the selection movement, whereby the spring 605 engages in a groove on the toothed rod, to the follower 601 which is connected to the shift shaft.

The follower 601 is seated by its springs 602, 603 and 605 in corresponding grooves 504a, 504b and 504c of the sleeve 501 and can be moved axially in same during a shift movement.

The groove 504c is designed wider so that an opening 507 is produced which extends axially lengthwise in the sleeve. The enlarged spring 605 extends outwards through this opening 507 and can thus produce a connection with the toothed rod in the transfer path of the selection movement. In another embodiment it can however also be advantageous if the connection arises so that an element associated with the toothed rod projects inwards through the opening 507 in the sleeve 501 to thereby connect with the follower 601.

For reasons of stability and in order to provide a possibility for mounting the sleeve 501 the opening 507 here preferably extends axially only over a partial region of the sleeve 501. In another embodiment however it can also be expedient if the opening 507 extends over the entire length of the sleeve 501.

The introduction of force to generate a shift movement is through the toothed rod 701 to the teeth 502 of the sleeve 501. The movement is transferred to the follower 601 connected rotationally secured to the shift rod through the positive locking spring and grooved connections formed by the springs 602, 603 and 605 as well as the grooves 504a, 504b and 504c.

The grooves 504, 504b, 504c and correspondingly the springs 602, 603 and 605, as well as in particular their flanks 611, 608 and 604 are formed so that with torque transfer the resulting force on the sleeve has a radial component acting towards the centre of the connection. In the event of strain therefore as a result of the spring and groove connection the opening of the sleeve is not bent up but drawn together. Furthermore the configuration of the flanks 611 causes particularly advantageously a large surface area contact in the event of force transfer. For this it is particularly advantageous if the flanks 611, 608 and 604 of the springs 602, 603 and 605 have the geometric shape of a so-called inverted involute. This includes here springs which are narrower at their radially further inner regions and wider at their radially further outer regions, whereby the width increases involute-like in the radial direction outwards on both sides or flanks. Compared with the involute teeth of a toothed wheel the tooth and gap are interchanged to the extent that the region which forms the tooth in one toothed wheel presently represents the gap and the region which forms the gap in one toothed wheel represents the tooth.

In the bottom of the sleeve there is a bore 506 (not visible in this view) which holds a bearing.

The enlarged spring 605 has an external region 606 which is formed in a circular sector shape relative to axial centre and which engages through a groove with the toothed rod in the transfer path of the selection movement and thus ensures positive locking over the entire rotational moving region of the shift shaft. In another embodiment it can also be expedient if the outer region 606 of the spring 605 is formed non circular sector shaped but has a different configuration.

FIG. 7 shows the toothed rod 701 in the transfer path of the shift movement as a direct connecting element between the element for transferring movement to the shift shaft and the drive for the shift movement. The toothed rod base body has two independent toothed splines 702, 703. Thus a very direct connection between the drive unit and the parts to be moved is achieved adapting well to the geometric peripheral conditions. The present arrangement can open up a number of degrees of freedom; the distance d between the toothed centres is advantageously as small as possible but selected so that the relevant engagement elements are not obstructed. The angle between the two toothed planes X1, Z1 and X2, Z2 can, provided the engagement elements do not obstruct one another, be selected anywhere between 0 and 360°. The independent arrangement of the two splines 702 and 703 enable where necessary also the use of different teeth. Preferably the same teeth are used for the two splines 701 and 703, by way of example an involute toothed spline. As a result of the geometric or other peripheral conditions however it can also be advantageous if the teeth 702 and 703 are different. A simple production of the desired transmission ratio can be achieved through the active radii of the engagement parts r1 and r2 of the pinion or toothed wheel.

The arrangement enables a particularly simple design in casting technology terms of the housing, particularly with regard to the arrangement of the different housing regions as a result of fewer sliders and extension directions.

The embodiment described here of the idea of the invention is by way of example. With reference to FIG. 4 the arrangement of the structural elements can also be turned around, for example corresponding to the existing structural space, about the axes a,b,c,d/h, g, f and/or e and/or the spacings of the axes can be enlarged and/or reduced compared to the present example.

The present invention is shown here using an embodiment in a gearbox in which an axial displacement of the shift shaft corresponds to a selection movement and a rotation corresponds to a shift movement. Obviously the invention can also be used in a gearbox where an axial displacement of the shift shaft corresponds to a shift movement and a rotation corresponds to a selection movement. The functions of the relevant drives are then changed over accordingly.

The present invention also relates to the earlier applications DE 19734050, DE 19804214, DE 19804217, DE 19814126, DE19928263, DE 19930869 and DE 19937544 or their follow-up applications whose contents belong expressly to the disclosure of the present application.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of these sub-claims can form independent and proper inventions in respect of the prior art on the priority date the applicant reserves the right to make them the subject of independent claims or part declarations. They can also contain independent inventions which have a configuration dependent of the subjects of the preceding subclaims.

The embodiments are not to be regarded as restricting the invention. Rather numerous amendments and modifications are possible within the scope of the invention, particularly those variations, elements and combinations and/or materials which through combination or modification of individual features or elements or process steps contained in the drawings and described in connection with the general description and embodiments and claims can be used by the expert to solve the problem posed and which through combinable features lead to a new subject or to new process steps or sequence of process steps insofar as these refer to manufacturing, test and work processes.

What is claimed is:

1. Motor vehicle with a drive motor, a torque transfer device with an actuating device, a gearbox with at least one shift shaft, an actuating device and a control device wherein:
   the actuation of the torque transfer device and the gearbox takes place automatically controlled through the control device or through an input to the control device;
   the actuation of the gearbox is comprised substantially of a first movement component and a second movement component;
   the gearbox actuating device has a first and second drive dedicated to the first and second movement components; and
   at the gearbox, the one movement component is a rotational movement and the other movement component is a translation movement,
   wherein a multi part element for connecting individual parts is provided for transferring movement to the shift shaft and includes at least one axial groove for the axial guidance and rotational movement transfer, as well as at least one ring groove or ring groove segment for the rotational guidance and axial movement transfer, and
   the multi part element for transferring movement to the shift shaft comprises at least one sleeve like element having a toothed spline, a follower, as well as a toothed rod.

2. Motor vehicle according to claim 1, wherein the first movement component comprises a selection component and the second movement component comprises a shift component.

3. Motor vehicle according to claim 1, wherein a kinematic transfer stretch for converting the movement of one of the drives into a selection movement comprises a first gearbox stage, as well as a second gearbox stage on an output side of the first gearbox stage.

4. Motor vehicle according to claim 3, wherein the first gearbox stage comprises a worm with worm wheel driven by the one drive and integrated in the one drive and second gearbox stage comprises a spur wheel and toothed rod.

5. Motor vehicle according to claim 1, wherein a kinematic transfer path for converting the movement of one of the drives into a shift movement comprises a first gearbox stage, a shift elasticity integrated in the one drive, as well as a second gearbox stage provided on an output side.

6. Motor vehicle according to claim 5, wherein the first gearbox stage comprises a worm with worm wheel driven by the one drive and integrated in the one drive and second gearbox stage comprises a spur wheel and toothed rod.

7. Motor vehicle according to claim 1 wherein at least one of:
   axial relative movement is possible between element parts of the multi part element for transferring movement to the shift shaft,
   a rotational relative movement is possible between other element parts.

8. Motor vehicle according to claim 1 wherein the multi part element for transferring movement to the shift shaft enables an uncoupled movement transfer of the selection and shift movement to the shift shaft.

9. Motor vehicle according to claim 1 wherein at least one of:
   the follower and the sleeve like element are in active connection by means of at least one axial groove, and
   the follower and the toothed rod are in active connection by means of ring groove segment whose centre point is at least close to the axis of the sleeve like element.

10. Motor vehicle according to claim 1 wherein at least one of:
    the introduction of a rotational movement through the sleeve like element is possible over a certain region independently of an axial relative position between the sleeve like element and follower, and
    the introduction of an axial movement through the toothed rod is possible over a certain region independently of the rotational relative position between the toothed rod and follower.

11. Motor vehicle according to claim 10 wherein the certain region in which the introduction of the rotational movement is possible independently of the relative position of the sleeve like element and follower relative to each other corresponds at least roughly to the region in which the shift shaft is axially movable.

12. Motor vehicle according to at least claim 10 wherein the certain region in which the introduction of an axial movement is possible independently of the relative position of the toothed rod and follower relative to each other corresponds at least roughly to the region in which the shift shaft is rotationally movable.

13. Motor vehicle according to claim 1 wherein the follower of the multi part element for transferring movement to the shift shaft is connected rotationally secured and axially secured to the shift shaft.

14. Motor vehicle according to claim 1 wherein the transfer of the selection movement is through the toothed rod and the follower.

15. Motor vehicle according to claim 1 wherein the transfer of the shift movement is through the sleeve like element and the follower.

16. Motor vehicle according to claim 1 wherein the follower has springs which correspond to grooves located in the sleeve like element.

17. Motor vehicle according to claim 16 wherein the formation and number of the grooves or groove flanks and accordingly the springs or spring flanks are suitable to centre the follower in the sleeve like element during rotational strain.

18. Motor vehicle according to claim 16 wherein the sleeve like element has a longitudinally extending opening.

19. Motor vehicle according to claim 18 wherein the opening does not extend over the entire length of the sleeve like element.

20. Motor vehicle according to claim 18 wherein the opening does extend over the entire length of the sleeve like element.

21. Motor vehicle according to claim 18 wherein the length of the opening corresponds at least approximately to the travel path of the shift shaft in which it is axially movable.

22. Motor vehicle according to claim 18 wherein the opening is produced by widening one of the grooves.

23. Motor vehicle according to claim 18 wherein the opening is provided as an opening between two grooves.

24. Motor vehicle according to claim 18 wherein the opening during axial relative movement between the follower and sleeve like element fulfils a guiding function for the follower.

25. Motor vehicle according to claim 18 wherein a connection between the follower and toothed rod can be made through the opening in the sleeve like element.

26. Motor vehicle according to claim 16 wherein one of the springs of the follower is formed wider so that it extends outwards through the opening of the sleeve like element.

27. Motor vehicle according to claim 26 wherein an end area of the spring of the follower extending through the opening of the sleeve like element closes with the centre point to the axis of the shift shaft in a circular sector shape.

28. Motor vehicle according to claim 18 wherein an end area of the spring of the follower extending through the opening of the sleeve like element itself forms a spring which sits in a corresponding groove in the toothed rod rotationally movable and axially transferring movement.

29. Motor vehicle according to claim 18 wherein the side edges of the grooves are formed so that during force transfer the resulting force on the sleeve like element has a radial component which causes load in a closing direction of the opening.

30. Motor vehicle according to claim 18 wherein the side edges of the grooves have the shape of an inverted involute.

31. Motor vehicle according to claim 5 wherein the toothed rod is formed in a transfer path of the shift movement as a double toothed rod which has two independent toothed splines.

32. Motor vehicle according to claim 31 wherein the angle of the toothed planes relative to each other and the axial spacing between the toothed splines enables the one drive to be arranged relative to the shift shaft adapted to an existing structural space.

33. Motor vehicle according to claim 31 wherein the toothed planes are roughly at right angles to each other.

* * * * *

UNITED STATES PATENT AND TRADEMARK OFFICE
CERTIFICATE OF CORRECTION

PATENT NO. : 6,834,562 B2
DATED : December 28, 2004
INVENTOR(S) : Norbert Esly et al.

It is certified that error appears in the above-identified patent and that said Letters Patent is hereby corrected as shown below:

<u>Title page,</u>
Item [75], Assignee, please delete "Luk Lamellen und Kupplungsbau Beteiligungs KG" and substitute -- LuK Lamellen und Kupplungsbau Beteiligungs KG --.

Signed and Sealed this

Nineteenth Day of April, 2005

JON W. DUDAS
*Director of the United States Patent and Trademark Office*